No. 794,323. PATENTED JULY 11, 1905.
W. S. SMALL.
POISON VAULT.
APPLICATION FILED NOV. 7, 1904.

Witnesses
C. G. Hague
S. F. Christy

Inventor W. S. Small.
By Orwig Lane atty

No. 794,323.

Patented July 11, 1905.

UNITED STATES PATENT OFFICE.

WILLIAM S. SMALL, OF DES MOINES, IOWA, ASSIGNOR TO JOHN S. GILCREST, OF DES MOINES, IOWA.

POISON-VAULT.

SPECIFICATION forming part of Letters Patent No. 794,323, dated July 11, 1905.

Application filed November 7, 1904. Serial No. 231,682.

*To all whom it may concern:*

Be it known that I, WILLIAM S. SMALL, a citizen of the United States, residing at Des Moines, in the county of Polk and State of Iowa, have invented certain new and useful Improvements in Poison-Vaults, of which the following is a specification.

The objects of my invention are to provide a device of this class of simple, durable, and inexpensive construction in which bait containing poison may be placed in such manner that rats and mice may have ready access to it and yet cannot carry away any large pieces of the bait, and, further, to provide a device of this class in which the poison bait is inaccessible to fowls and larger animals.

In many instances persons desiring to exterminate rats and mice hesitate in using poison bait for the reason the fowls, birds, and other animals are likely to find the bait, and even if the bait is concealed the rats and mice are likely to carry away large pieces of the poison bait and deposit such pieces where fowls and other animals may find it; and my object is to avoid these objectionable results.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 2:
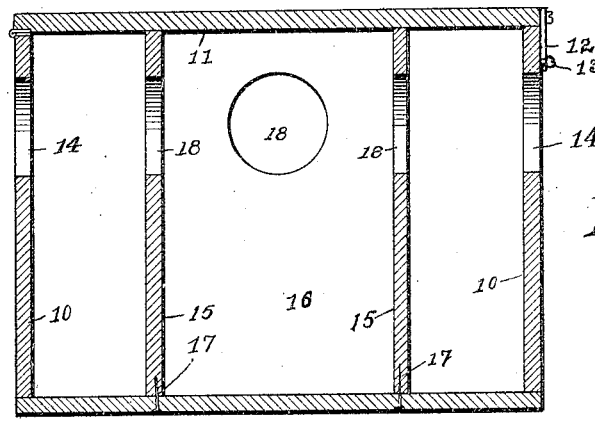
Figure 1:
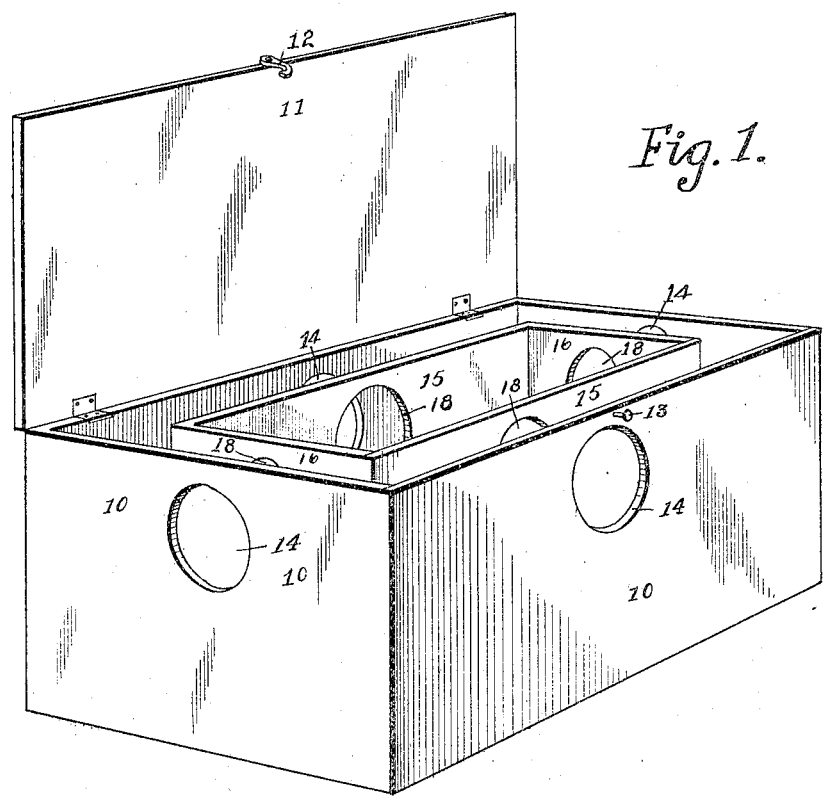

Figure 1 shows the poison bait in perspective with the cover opened, and Fig. 2 shows a central transverse sectional view with the cover closed.

Referring to the accompanying drawings, I have used the reference-numeral 10 to indicate the outer box composed of a solid bottom, sides, and ends and a hinged top 11, provided with a hook 12 to engage a pin 13 on the solid front. In each side and end, near the upper end thereof, I have formed a round opening 14 large enough to admit rats and mice and so arranged at such height from the bottom that animals of this class in order to enter the box must stand on their hind feet in order to pass through the opening. On the interior of the outer box is an inner box composed of sides 15 and ends 16, secured to the bottom of the outer box by the nails 17, passed through the bottom in the said sides and ends. The inner sides and ends are separated from the outer ones so far that rats and mice passing through the openings 14 must first enter the space between the inner and outer boxes and stand upon the bottom of the outer box. The inner box is provided with openings 18, arranged at the same height as the openings 14 and preferably in line with said opening, so that rats and mice after entering through the openings 14 will pass to the bottom of the box between the inner and outer walls and must again rise on their hind feet in order to pass through the openings 18 into the inner box. The cover 11 obviously closes both the inner and outer box and makes the interior of the box comparatively dark.

In use the poison bait is placed within the inner box, and then the cover is closed and the poison-vault is placed in position where rats and mice may enter unmolested. The animals enter the box through the openings in the manner described, and when on the interior of the inner box and after having passed through the tortuous passage-ways required before entering the inner box they feel reasonably safe from molestation and will freely devour the bait. When rats and mice wish to carry away edible substances, they usually take articles larger than they can carry in their mouths, and they carry such articles between their front feet and hop along on their hind feet, and articles that are too small to be carried in this way are usually devoured where found. By the construction of the vault before described it is impossible for an animal to carry away a large piece of the bait in the manner described, as the animal cannot hop away from the inner box, but must crawl through one of the openings in the inner box, then down to the bottom of the box, between the inner and outer walls, and then up and out through one of the openings in the outer walls, and in doing this the bait would have to be dropped and only such portions of the bait that the animals could carry in their mouths would be taken away, and these are usually eaten by the animals before leaving the box.

Having thus described my invention, what I claim, and desire to secure by Letters Patent of the United States therefor, is—

1. An improved poison-vault, comprising in combination an inner and an outer box, a cover therefor, said inner and outer boxes spaced apart to provide wide passage-ways between them, the walls of both the inner and outer boxes being provided with openings near their upper ends, for the purposes stated.

2. An improved poison-vault, comprising an outer box having a solid bottom, sides and ends, said sides and ends provided with openings near their tops, a hinged cover for the box and an inner box of smaller size comprising sides and ends secured to the bottom of the outer box with their tops flush with the bottom of the hinged cover when closed and provided with openings in their sides near their tops, said inner and outer side and end pieces separated a considerable distance to prevent rats and mice from passing through the openings in the inner walls after passing through the openings in the outer walls without first descending to the bottom, substantially as and for the purposes stated.

WILLIAM S. SMALL.

Witnesses:
J. S. GILCREST,
J. RALPH ORWIG.